(12) United States Patent
Wong (10) Patent No.: US 8,860,580 B1
(45) Date of Patent: Oct. 14, 2014

(54) SYSTEM FOR PROTECTING AGAINST THEFT OF METAL WIRE AND OTHER OBJECTS

(76) Inventor: Thomas K. Wong, San Francisco, CA (US)

( * ) Notice: Subject to any disclaimer, the term of this patent is extended or adjusted under 35 U.S.C. 154(b) by 823 days.

(21) Appl. No.: 13/066,903

(22) Filed: Apr. 27, 2011

(51) Int. Cl.
G08B 21/00 (2006.01)
G08B 13/14 (2006.01)
G05D 3/12 (2006.01)

(52) U.S. Cl.
USPC ........ 340/660; 340/568.2; 340/571; 700/292; 700/298

(58) Field of Classification Search
None
See application file for complete search history.

(56) References Cited

U.S. PATENT DOCUMENTS

| | | | | |
|---|---|---|---|---|
| 3,696,378 A | * | 10/1972 | Daniel | 340/568.2 |
| 4,268,823 A | * | 5/1981 | Rauchut et al. | 340/570 |
| 4,945,341 A | * | 7/1990 | Buttimer | 340/568.3 |
| 6,628,200 B1 | * | 9/2003 | Lin | 340/568.1 |
| 7,723,612 B2 | | 5/2010 | Butler | |
| 8,050,002 B2 | * | 11/2011 | Kim | 361/42 |
| 2008/0224546 A1 | * | 9/2008 | TeSelle et al. | 307/125 |
| 2009/0112375 A1 | * | 4/2009 | Popescu | 700/292 |
| 2009/0290275 A1 | * | 11/2009 | Staszesky et al. | 361/63 |
| 2010/0036538 A1 | * | 2/2010 | Stergiou et al. | 700/292 |
| 2010/0085189 A1 | * | 4/2010 | Caswell | 340/571 |
| 2011/0066296 A1 | * | 3/2011 | Nelson et al. | 700/286 |
| 2012/0022713 A1 | * | 1/2012 | Deaver et al. | 700/298 |
| 2012/0120790 A1 | * | 5/2012 | Berkowitz et al. | 370/225 |

* cited by examiner

Primary Examiner — George Bugg
Assistant Examiner — Renee Dorsey
(74) Attorney, Agent, or Firm — Thomas R. Lampe (57) ABSTRACT

Apparatus and method for protecting against theft of wiring or other object formed of electrically conductive material in which the object is connected to a source of electrical power. The voltage of the object is sensed by a voltage sensor and a transmitter actuated when the voltage sensor detects a voltage change in the object.

36 Claims, 4 Drawing Sheets

SYSTEM FOR PROTECTING AGAINST THEFT OF METAL WIRE AND OTHER OBJECTS

TECHNICAL FIELD

This invention relates to a method and apparatus for protecting against theft of wire and other objects of electrically conductive material.

BACKGROUND OF THE INVENTION

Price of copper has been low for decades at about $1 per pound. Around the middle of 2000's, the price of copper began to rise significantly. In 2006, copper price took a major jump to about $4 per pound. Ever since this rapid price increase, copper theft has become rampant. Copper wires have been stripped out of overhead power lines, streetlights, traffic signals, vacant properties, parks, stadiums, parking lots, construction sites, telecommunication and power facilities.

In response to this huge theft problem, laws and regulations have been enacted such as those requiring people selling copper wire at scrap yards to be photographed and fingerprinted, their driver's licenses copied and requiring a wait period for payment. However, the lack of resources to monitor and enforce the laws renders them essentially ineffective. Some utility companies started to offer large rewards, painting or marking their copper wires, and switching to wires with less copper and posting signs that the new wires are not worth stealing. Some cities pour concrete over utility covers or weld them shut. However, the thieves continue to steal wires from the utilities, and break open secured utility covers. Some other cities turn on their streetlights all day, but could only deter the less skilled thieves. Surveillance cameras and placement of alarms on the wire pull boxes have also been considered and tested, but cameras can cover very limited range, and the enormous number of wire pull boxes and hand holes on the streetlights make it an economic challenge to implement these protection devices.

Lastly, anti-theft cable retainers have been developed, including one shown in U.S. Pat. No. 7,723,612, to clamp the electrical wires to the pole fixture and foundation. This approach, however, does not preclude a thief from cutting the wires between pull box to pull box, not to mention the large labor cost involved in installing the tens of thousands of cable retainers. The tried and trued approach of having vigilant citizens reporting suspicious activities or crime in progress is still of significant value, but it is not a reliable method to detect theft or even feasible in remote areas. In short, despite of the numerous efforts and attempts, wire theft remains largely an unsolved problem.

The subject invention can overcome the limitations of prior art approaches and it is relatively simple as well as highly cost effective. Before describing the invention, a general review of the common wiring systems and power controls methods is beneficial.

Electrical wires generally carry two types of current, AC (alternative current) or DC (direct current). In the AC category, for transmission efficiency, high power electrical lines typically use 3-phase AC. For long distance transmission, very high voltage is also used to further reduce the size of the transmission wires. 3-phase AC can transmit power through a 4-wire or 3-wire system; to save the cost of an extra wire, 3-wire 3-phase AC is very commonly used. For electrical applications, such as streetlights, it is typically single-phase and at a lower voltage than that of the power transmission lines. The very high voltage of transmission lines is typically stepped down to a lower voltage by a transformer before connecting to a service point of a group of electrical loads.

The wiring system of streetlights is a good example to illustrate how typical electrical services are distributed. The starting point is called a service point, which contains electrical gears to control and supply power to a number of streetlights, which may consist of dozens of light fixtures. A wire pull box is installed next to a service point enclosure where underground conduits are connected to each light fixture through a combination of main conduit branches and sub-branches. Sub-branches are connected to the main branches or other sub-branches in a daisy-chain or star configuration. A wire pull box is installed next to each light fixture. Alternatively conduits are stubbed out directly from the foundation of a fixture and with wire accessed through a hand hole at the base of a pole. Streetlights are connected either through a 2-wire or 3-wire system.

Inside a service point enclosure, in addition to the typical electrical gears such as circuit breakers, the main power control to all the lights connected to the service point is through a contactor, which is a relay with large contact points capable of passing through high currents to power a group of lights. The activation of the contactor is done electro-mechanically through a wire coil or electronically through a solid-state circuit. Since the activation current of the contactor is small, light current control devices such as a small manual switch, photocell or time clock can be used to control the entire group of lights at the service point. Although it is common that only one photocell or time clock is used to control all the lights in the group, there are also configurations in which each fixture has an individual photocell or control device. The key difference is that under a single control, the distribution wires are not energized if the main control is off, creating an intermittently energized wiring configuration. When an individual fixture has its own control device, the distribution wires are usually always energized. The intermittently energized wiring configuration creates unique challenges to wire protection, which will be discussed below.

There are more complicated wiring systems such as those used for industrial applications. An example is a conveyor belt system in a mining or aggregate plant operation. However, their basic wiring layout is very similar to those of the streetlight system mentioned above except that they typically use 3-phase AC instead of single phase, and their controls are not photocell or timer. Remote controls are generally used to control the power contactors of industrial electrical loads. Further, for controlling motors, the contactor device includes an overload relay; the combined unit is commonly called a starter.

The most common type of starter is full voltage, which behaves like the contactors in light control. Once an activation voltage is sent to the starter, the contacts close and power is transmitted to the motor. There are soft starters, which respond to varying control voltage or current, and then send various levels of line voltage down to the electrical load, such as a large heating element. Soft starters complicate the task for protecting electrical wires, but the subject invention can handle this situation easily as well. Depending on the design of a motor, if speed control is required, different wiring configurations are necessary to match the motor type, but it still follows a simple fact that the transmission wires are energized in some fashion in response to the control settings.

Besides AC power, DC power is also used to send power or signal down transmission wires. An example of DC application is telephone wires. In some applications, such as landscaping, both AC and DC are used, such as using low voltage AC for irrigation control circuits and low voltage DC for solar powered lighting.

For overhead power line protection, the challenge is presented by the miles and miles of continuous wires and it is difficult to quickly identify the location where the cables are cut so that action can be taken promptly. The lack of precise location for prompt response makes the overhead power lines another target for skilled wire thieves.

The above discussion summarizes the range of conditions and challenges for wire protection. Nonetheless, regardless of high or low voltage, AC or DC, the types of power control, the length of the transmission wires, and whether the wires are intermittently energized, the subject invention can protect the wiring systems cost effectively.

DISCLOSURE OF INVENTION

The subject invention is low cost, easy to implement, can reliably guard a large quantity of wires, and able to offer protection under a wide range of electrical wiring configurations and power supply conditions. It can protect any metal wires and elongate objects made of electrically conductive materials including but not limited to copper. It consists of two main parts: a theft detection component and an intervention component. Once theft is detected, intervening measures are implemented to stop the crime in progress.

The present invention relates to a system for protecting against theft of an elongate object formed of electrically conductive material. The system incorporates both a method and apparatus.

The method includes the step of providing a source of electrical power and at a first selected location on an elongate object connecting the elongate object to the source of electrical power to electrically energize the elongate object.

At a second location on the elongate object spaced from the first location a voltage detection unit including a voltage sensor and a signal transmitter is connected to the elongate object.

The voltage sensor is employed to sense the voltage of the elongate object. The signal transmitter is activated to send a signal responsive to the voltage sensor sensing a change in voltage of the elongate object.

The apparatus of the system is also for protecting against theft of an elongate object formed of electrically conductive material and connected to a source of electrical power.

The apparatus includes a voltage detection unit connected to the elongate object. The voltage detection unit includes a voltage sensor and a signal transmitter. The voltage sensor senses the voltage of the elongate object and the signal transmitter sends a signal responsive to the voltage sensor sensing a change in voltage of the elongate object. A signal receiver is provided for receiving the signal. The system of the invention has particular application to protecting wire but has application to other elongate objects.

Other features, advantages and objects of the present invention will become apparent with reference to the following description and accompanying drawings.

MODES FOR CARRYING OUT THE INVENTION

Figure 1:
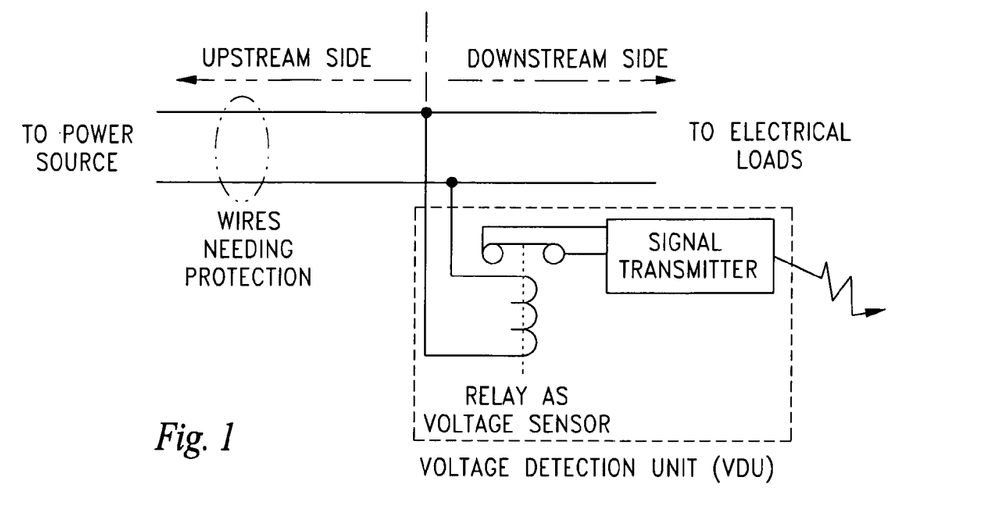
FIG. 1 is a schematic view illustrating components of a voltage detection unit of the invention operatively connected to electrical transmission wires.

A basic component of the present system invention is the utilization of one or more voltage detection units (VDUs). FIG. 1 shows a single voltage detection unit attached to electrical transmission wires attached to a power source. Each detection unit employed has a voltage sensor and a signal transmitter. The voltage detection units are attached to the wires needing protection, which must be energized by an electrical voltage. The voltage sensors must be capable of detecting the voltage carried by the wires under protection. There are many types of voltage sensors available; many of them use complicated electronic circuits. However, a simple relay can be used as the most economical voltage sensor. To use a relay as a voltage sensor, its electro-magnetic coil or solid-state trigger circuit is connected to the wires being monitored. When line voltage is present on the wires under protection, the contacts of the relay close as its coil is energized by the line voltage, which in turn sends a signal through the signal transmitter to a signal receiver to show that line voltage is detected. When no voltage is present in the wires such as when the wires are cut, the relay is de-energized and its contacts open, an alarm signal is then sent through the transmitter.

To understand how to use a voltage detection unit to protect metal wires employing the teachings of this invention, one needs to define the length of the wires between a voltage detection unit and the power source as the upstream side, and the length of wires after a voltage detection unit and away from the power source as downstream side. See FIG. 1. A cut made in a wire on the downstream side of a particular voltage detection unit will have no effect on that voltage detection unit. However, even if only one wire is cut on the upstream side, the relay will lose power to its coil or trigger circuit, which in turn will cause the contacts to open, sending an alarm signal. In other words, a voltage detection unit can detect power loss upstream thereof, but not downstream thereof. To increase the length of wires being protected by a voltage detection unit, it should be moved as far away from the power source as possible, typically right at the electrical load to protect the entire wire run. This simple illustration can indeed be used to protect for example an extension cord.

A signal transmitter can be as simple as a pair of wires linking a voltage sensor's contacts to a signal receiver. In practice, a signal transmitter is likely a wireless device due to the high cost and difficulty in running signal transmission wires after the fact. For short-range wireless signal transmission, battery powered transmitters capable of operating a number of months without battery change are available.

Figure 2:
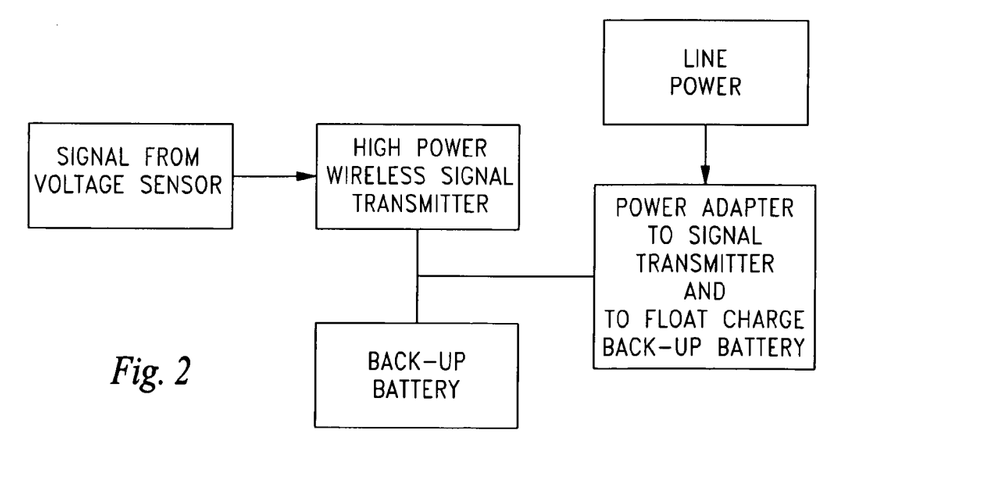
FIG. 2 is a schematic diagram showing a wireless signal transmitter employable in a voltage detection unit and components for supporting the transmitter.

Referring now to FIG. 2, for long-range wireless signal transmission, which requires a more powerful transmitter consuming more energy, power to the transmitter needs to be drawn from the line power on the wires under protection through a power adaptor. Since the line power can be cut, a back-up battery under maintenance float charge must be included. This is to allow signal transmission even when line power is not available. FIG. 2 is a schematic diagram of the abovementioned components for supporting a high power wireless signal transmitter. Further, to provide reliability, the wireless signal transmitter should be designed for transmitting alarm signals with supervising circuitry. With a supervised transmitter, the conditions for proper functioning of the transmitter are constantly monitored by the signal receiver. Supervised wireless alarm transmitters are commercially available and they are not costly.

Figure 3:
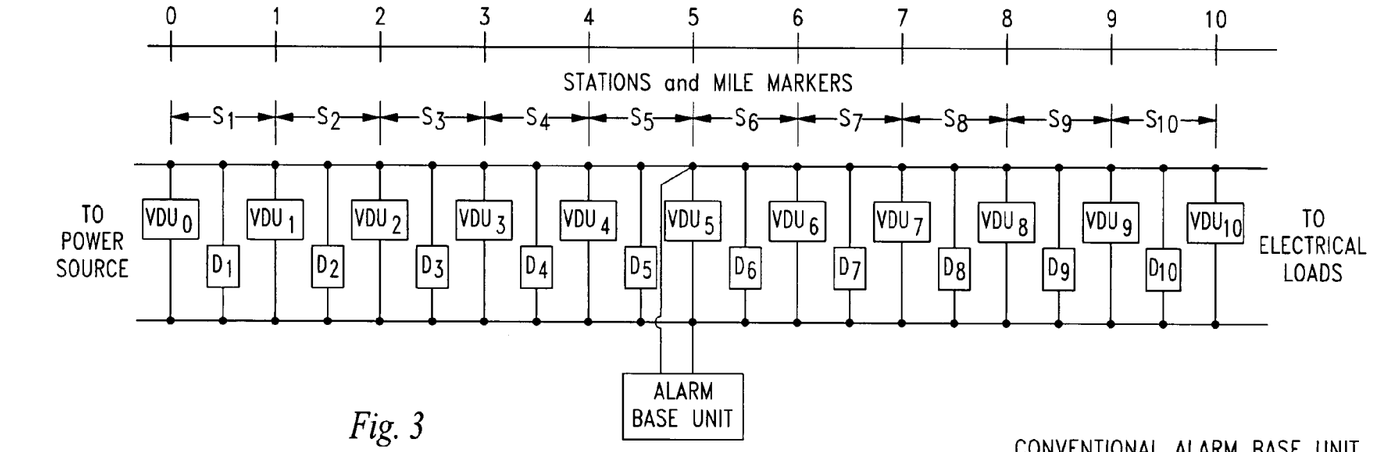
FIG. 3 is a diagrammatic illustration illustrating use of a plurality of voltage detection units in operative association with power lines and an alarm base unit.

Other than a relatively short run of electrical wires, a series of voltage detection units with a systematic identification of each unit is critical and necessary. With reference to FIG. 3, the following example illustrates how to use the subject invention to protect a 10-mile long overhead power line. After a thief has chopped down a power pole and cut its power line, all the power users downstream already know that they lost power; they do not need a voltage detection unit to tell them what they already know. The problem is how to locate the trouble spot in a very long stretch of power line. With the subject invention, the trouble spot can be identified immediately and intervening measures can be promptly implemented.

FIG. 3 shows the system layout for the power line protection example. Power source is at Station 0; every subsequent mile is marked with a station number corresponding to its distance from the power source. For example, Station 10 is at the 10th mile and at the end of the transmission line. At each station, a voltage detection unit (VDU) is installed; for instance, VDU10 is the voltage detection unit at Station 10. The segment of the power line in between each station is named accordingly, for example S1 is the segment between Station 0 and Station 1.

An alarm base unit is always preferably installed midway along the length of the transmission wires under protection to reduce the need for using higher power transmitters and receivers. With a series of VDUs, the location where the transmission line is cut can be located quickly. Assuming a thief cut the power line between Stations 3 and 4, all the VDU's from Station 4 down will be tripped, sending signals to the alarm base unit. However, VDU1 to VDU3 will still show normal voltage status, indicating that power is interrupted at Segment 4. Other than the wires, as there are no other elements to fail that can cause voltage loss from Station 4 downwards, one can draw a clear conclusion of transmission line failure at Segment 4. Intervening measure can be deployed to that location.

As illustrated before, although the subject invention may work with only one VDU, at least two VDUs are preferred. With the confirmation that an upstream VDU has normal voltage, when a downstream VDU is tripped, it becomes affirmative that line power in between is interrupted. No question needs to be raised or investigated whether there is an area wide power outage.

The protection system shown in FIG. 3 can be used for actual applications. For a 3-phase 3 or 4-wire transmission line, another set of VDUs may be added to protect the 3rd leg of the transmission wire to provide 100% protection. However, thieves do not usually pick and choose a single wire to steal, even just one set of VDUs can offer outstanding protection.

Figure 4:
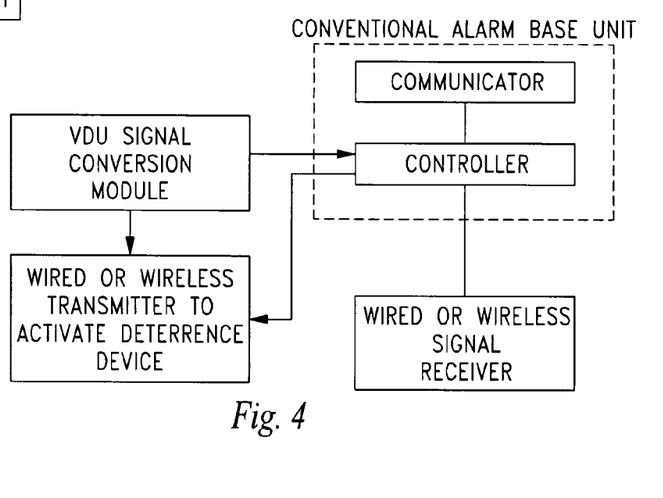
FIG. 4 is a schematic diagram of an alarm base unit.

Completing the description of the wire theft detection component, FIG. 4 shows the schematic diagram of an alarm base unit. A conventional alarm base unit includes a controller, a communicator, and a backup battery. The controller programs and controls the function of the alarm base unit including arming and disarming the system, and identifying the incoming alarm signals and in turn sending the signals beyond the premise through the communicator. The communicator sends the alarm signals through email, text message, and voice mail to a receiver, such as a phone or computer, directly accessible by individuals or to a remote alarm receiver such as those housed in an alarm-monitoring center. A variety of communicators are available, including those for regular phone line, Internet, radio and cellular. For the subject invention, a conventional alarm base unit will work. This is particularly the case when a very small number of VDUs are being monitored and each VDU is systematically identified as per the above-stated requirements.

However, when a large number of VDUs are being monitored, a conventional "point based" alarm unit will not work well in practice. For instance, in the previous overhead power line example, seven VDUs (from VDU4 to VDU10) would have sent signals when a wire in Segment 4 is cut. An alarm-monitoring agent needs to have intimate knowledge to know that the seven signals are related, and knows how to interpret the signals as Segment 4 wires being down. Proper labeling of the VDU signals from upstream to downstream in an organized methodical manner will help, but if what he/she sees is just Segment 4 being down, any agent can act on such straightforward alarm message and respond accordingly to an event. Better yet if Segment 4 is mapped to an actual street segment or between 2 Global Positioning System coordinates, succinct location information can be related to the responding party of the incident. To accomplish this task, an alarm signal conversion module is added to a conventional alarm controller as shown in FIG. 4. This is a simple signal conversion module to convert VDU signals into a segment description in the alarm message being sent to the communicator. This unique "segment based" alarm unit capable of implementing the teachings of this invention will enable the subject wire protection system being monitored easily by typical low cost alarm monitoring services.

With regard to wire theft intervention, the most effective approach is to monitor the wire alarm signals and dispatch responding authorities when a theft event is detected. When reliable fast response is not always possible, to reduce the extent of damage, local intervention measure can be implemented. As shown in FIG. 4, based on the input from the signal conversion module and the programmed instructions from the controller, an alarm activation signal can be sent via a wireless transmitter to the corresponding deterrence device to protect the wires. FIG. 3 illustrates deterrence devices D1 through D10 operatively associated with segments 1-10. For example, a deterrence device may consist of a warning light, siren, and verbal warning. In the previous illustration, when Segment 4 is under attack, a "segment based" alarm unit will be able to send automatically a wireless signal to activate deterrence device D4 if it is programmed to do so.

Figure 5:
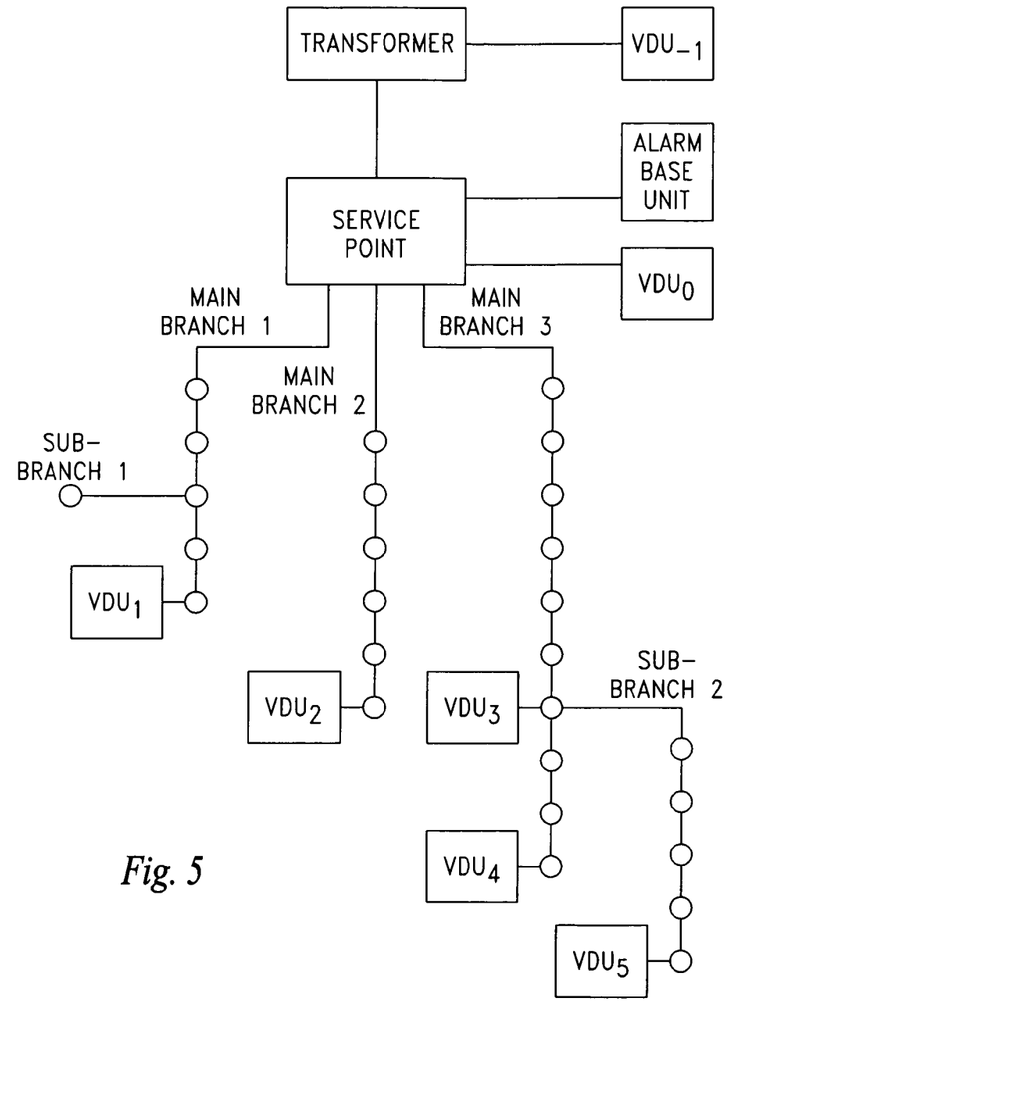
FIG. 5 is a schematic line diagram showing a group of streetlights connected to a service point.

Referring to FIG. 5, the following streetlight protection example further demonstrates the capability of the subject invention; the lighting systems for parks, stadiums, and parking lots are all very similar. FIG. 5 is a schematic line diagram showing a group of streetlights connected to a service point, circles denoting the streetlights. The alarm base unit and voltage detection unit VDU0 are connected to the service point and placed in its enclosure. Main branch MB2 is protected by voltage detection unit VDU2. Any wire cut in any one of the many segments in MB2 will cause VDU2 to trip. If VDU0 at the service point is normal, a confirmed alarm will be sent. Likewise, the entire main branch MB1 is protected by VDU1. However, unless a voltage detection unit is added to sub-branch SB1, that section of wires is not protected. For main branch MB3, all its wires are protected by VDU4, and sub-branch SB2 is protected by VDU5. VDU3 is not necessary, particularly if the group of lights is in close proximity of each other, but adding VDU3 will allow better location identification for the wires segments among VDU0, VDU3, VDU4 and VDU5. To protect the wire run between the transformer to the service point, VDU-1 can be added. With just a small number of voltage detection units and an alarm base unit, the many segments of wires are properly protected. This is in big contrast to the prior art of placing alarms on the wire pull box or hand hole covers, which requires numerous alarm sensors to be installed, about an order of magnitude more as compared to the subject invention.

Figure 6:
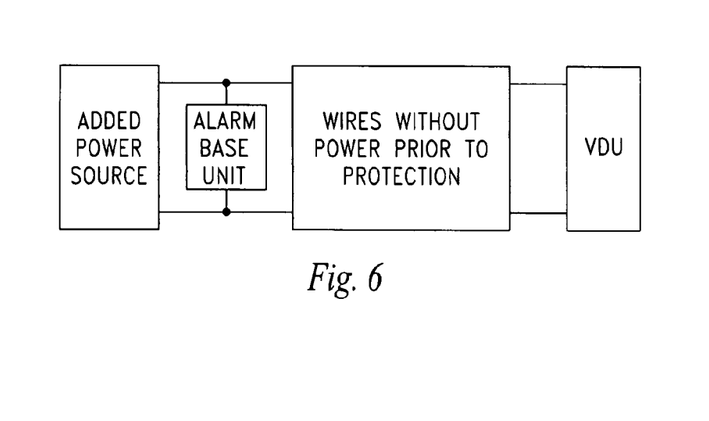
FIG. 6 is a diagrammatic illustration depicting wires being energized by a supplemental power source in operative association with a voltage detection unit and an alarm base unit.
Figure 7:
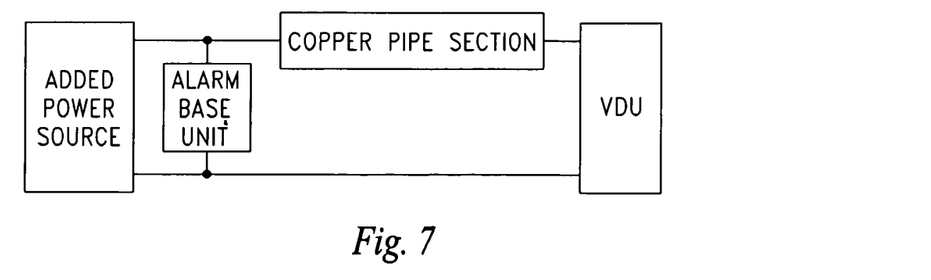
FIG. 7 is similar to FIG. 6, but illustrating a copper pipe section being energized by an added power source and operatively connected to a voltage detection unit and alarm base unit.

There are many situations in which many segments of wires are not energized because their power has been switch off or removed. An example is the wirings in a vacant property. With reference to FIG. 6, these wires can be protected by adding a power source. Where line power is permanently disengaged, battery power or solar power can be introduced to the electrical wirings. Of course, an alarm base unit and at least one voltage detection unit (VDU) are needed. The wire protection system is the same as described above except the added power source. Since a voltage detection unit draws very little power, battery or solar power with battery backup will work very well. The same system can be used to protect any electrically transmissive objects without power, such as copper piping, see FIG. 7. If the copper pipe is cut or removed, the voltage detection unit (VDU) associated therewith will be tripped.

Protecting intermittently energized wires creates a more difficult challenge. An example of such a condition is a group of streetlights controlled by a timer or photocell. When the group of lights is switched off, for example during daytime, there is no power in the power distribution wires. The solution is the same as protecting un-energized wires, that is, by adding a power source when the group of lights is switched off. There are two requirements for the additional power source: 1) the power source shall not activate or damage the electrical load and 2) it cannot conflict with the regular line power when it is switched on.

Selecting an appropriate additional power source is relatively easy. Most of the electrical wires needing protection carry high voltage AC, therefore, using DC or lower voltage AC will work. For example, unless an adequate level of AC voltage is applied to a streetlight ballast and electric motor, these electrical loads will not be activated. Further, a significantly lower voltage than the regular line voltage will not damage the electrical load in almost all situations. Making the additional power source not conflict with the line power when it is switched on is more complicated.

Figure 8:
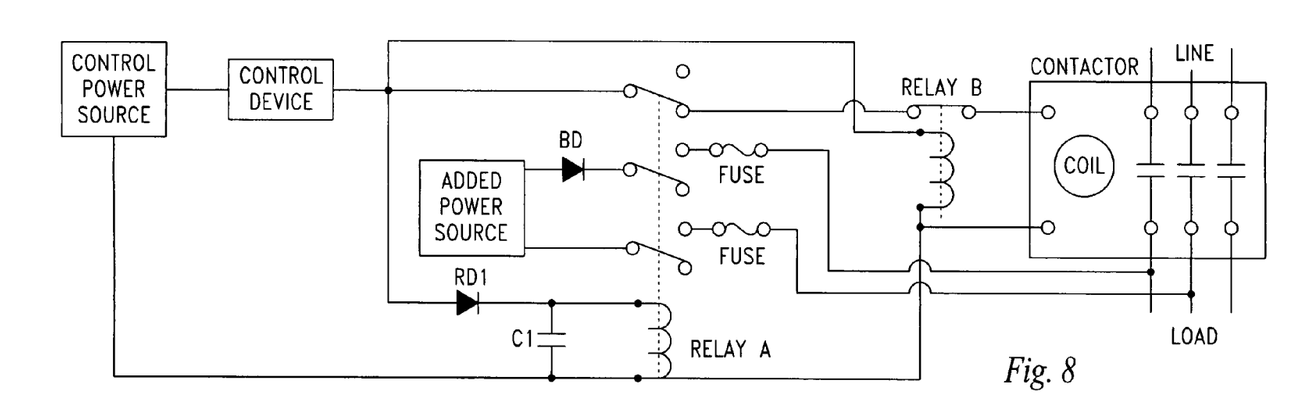
FIG. 8 is a schematic diagram illustrating an embodiment of the system wherein supplemental power is introduced to electrical wires when they are intermittently energized.

FIG. 8 shows how to introduce supplemental power to the electrical wires when they are intermittently energized. Due to the large amount of current involved, the intermittently energized wires are almost always controlled by a contactor. The contacts of the contactor are controlled by an electromagnetic coil or its solid state equivalent. For convenience, let's call the energizing circuit of the contactor a coil. The power to activate the coil is sent by a control device, which can be a photocell, timer, switch, or a remote control device. When the coil is energized, the contacts on the contractor close, line power is connected to the load side to energize the electrical wires.

The best way to introduce an added power source, therefore, is through connecting a switching relay in parallel with the contactor coil. In FIG. 8, when the control device sends an activation voltage, line power will be sent down the wires on the load side, but with a small time delay for safety reasons. The activation voltage sent by the control device will first activate the coil of the switching relay of the added power source (Relay A), triggering its contacts to disengage the added power source from the wires on the load side of the contactor. Another set of contacts of this same relay will engage at the same time to relay activation voltage to the contactor's coil. When the control device calls for the contactor coil to de-energize, Relay B will immediately de-energize causing deactivation of the contactor coil, the contacts on the contactor open as a result, cutting off line voltage to the wires on the load side. Since there is a possibility of high electrical charge built up due to capacitance in the load circuit, it is prudent to delay the introduction of low voltage from the added power source after the charges in the wires are fully dissipated. The capacitor, C1 at the switching relay of the added power source (Relay A) controls the delay time. The size of the capacitor must be large enough to achieve the delay duration necessary. The diode RD1 at Relay A is to keep the charge of this capacitor for use in the coil of Relay A only.

As a safety measure, fuses must be added to the connecting wires as shown to protect the added power source and the circuit wiring in case the contacts of Relay A malfunction. In addition, it is a good extra measure to add a high voltage blocking diode BD to further protect the added power source from such a malfunction.

The added power source can be set up in a number of ways. The simplest form is to use only batteries. An additional easy improvement is to add a float charger that is powered by the line power. Alternatively, a low voltage power adaptor can be connected to the line power source without using any batteries for backup. It is a cheaper approach, but not as robust, as it does not offer any wire protection when there is a general power outage since the wires will not have any backup power voltage. The voltage level introduced to the electrical wires will be the voltage of the low voltage power adaptor or at the battery voltage if it is used. The battery voltage may also be stepped up to a higher level as necessary through a converter.

When there is only one type of voltage on the line, a simple relay is an ideal economical voltage sensor. However, when either high or low voltages may exist, one cannot add both a high and a low voltage relay at the same time. High voltage on the line will damage a low voltage relay. Voltage sensing circuits and devices with alarm output capable of detecting a wide range of voltages are not new. In fact, integrated circuit chips for voltage measuring are readily available. However, they all require power to operate, drawing power from the line with intermittent high and low voltages means that the power supply of the voltage sensor requires proper consideration. The best approach is to use a power supply that draws power from regular line power, have a backup battery, and charge it when regular line power is available. When the line wires carry low voltage, just use backup battery as its power source. This is the same configuration as shown in FIG. 2 for a high power wireless signal transmitter. Alternatively, one can use batteries and replace them periodically. These two power supply alternatives work for both the voltage sensor and wireless signal transmitter.

Whenever batteries are used, periodic maintenance is required. For new wiring installation, particularly for shorter distances, signal transmission wires for the voltage sensor can be cheaply and easily run to the alarm base unit, avoiding the need for a wireless transmitter that requires power. It is desirable to have a voltage sensor for intermittently energized wires that does not require any power to operate other than the various levels of line voltages. This can reduce maintenance costs.

Figure 9:
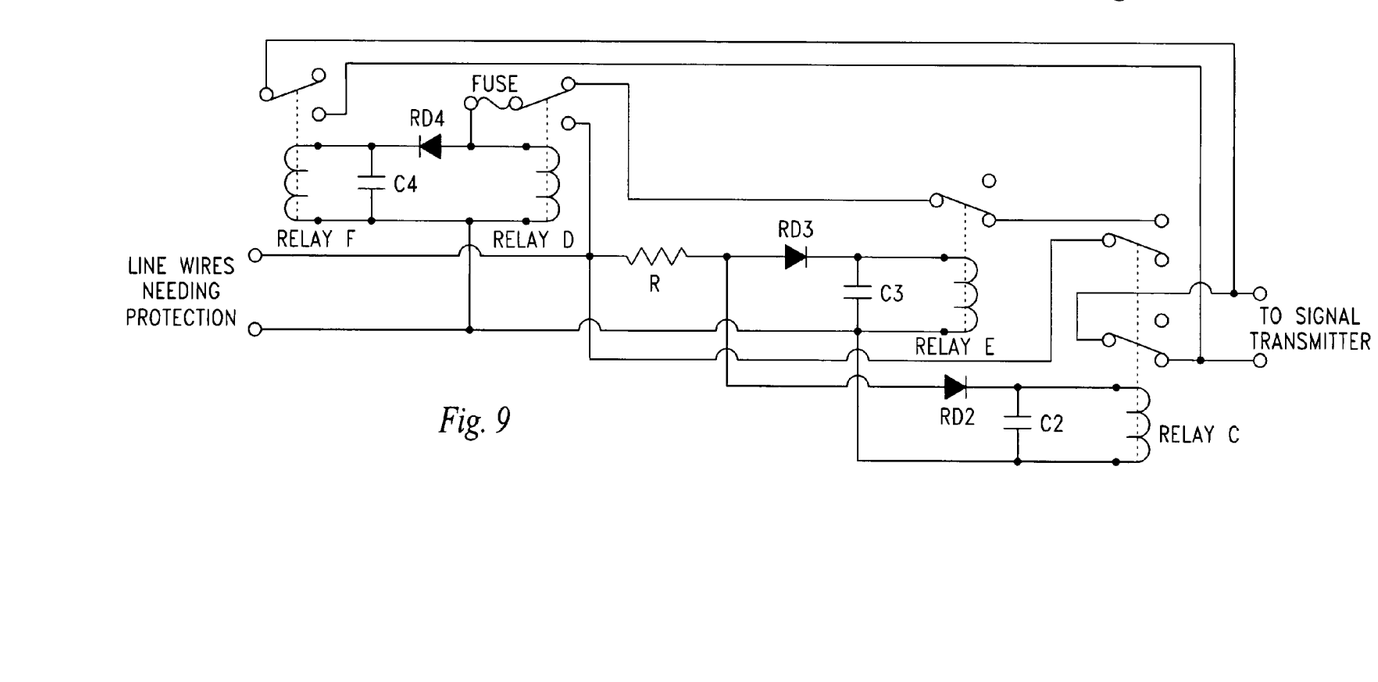
FIG. 9 is a schematic diagram illustrating an arrangement wherein a voltage sensor is utilized in association with intermittently energized wires and alternatively energizable by high voltage line power or a source of low voltage power and providing for the dissipation of high electrical charges built up by the connection to high voltage power prior to making a connection to the source of low voltage power.

FIG. 9 is such a device that follows the teachings of this invention, and it can be created with four low cost relays and some simple components.

First, this voltage sensor must be able to detect and switch automatically between the regular line voltage and the voltage from the artificially introduced power source, which again, is most likely at a substantially lower voltage than that of the line power. As discussed above, due to the existence of capacitance in many circuits, high voltage electrical charge may still exist for a short duration after line power is switched off. For safety reasons, any voltage switching must allow sufficient time to lapse to let the capacitance charge fully dissipate before switching from high to low voltage operation. Therefore, time delay control and other safety measures must be introduced to the voltage sensor. Further, the alarm signal operation is not to be interrupted during the switching process and send out nuisance alarms.

To accomplish the above requirements, the voltage sensor capable of protecting intermittently energized wires as shown in FIG. 9 has the following functions. It has a regular line voltage detection relay, Relay C, with delayed deactivation ability and with two sets of contract points, one for sending alarm signals, and the other one for switching to low voltage detection. The coil of this relay is always attached to the line wires needing protection behind a resistor R. The resistor is to drop the line voltage significantly and to allow low cost relays and components to be used. If regular line voltage is present in the wires, Relay C activates and sends a normal signal to the signal transmitter. When regular line voltage is not detected, and after a time delay to clear high voltage charges expires, Relay C deactivates. The deactivation of Relay C causes its contacts to engage the coil of the low voltage detection relay, Relay D, to the line wire to monitor for low voltage from the artificially introduced power source. This switch over process is effectuated by a delay deactivation relay, Relay E, attached to the line wires. Relay E accomplishes this task by engaging the coil of the low voltage detection relay, Relay D, to the line wires. The low voltage detection relay has one set of contacts to disengage its own relay coil from connection to the line wires.

Another relay, Relay F, is connected in parallel to the low voltage detection relay, Relay D. Relay F has one set of contacts to send alarm signals. To prevent nuisance alarm signals caused by switching time gaps, Relay F has delays deactivation components. As long as there is low voltage in the line wires, both Relay D and Relay F activate and send a normal signal. If no low voltage is present in the line wires, Relay D and Relay F will not activate, and an alarm signal is sent through the contacts of Relay F. In addition, the relay coil of Relay D disengages from the line wires, which is also the natural condition (without any power) of the unit. When regular line power resumes Relay C and Relay E are energized and a new monitoring process starts.

For this voltage sensor to function properly, the delay deactivation time of Relay C shall be longer than that of Relay A in FIG. 8, so that low voltage will be present at the voltage sensor when it switches from detecting high to low voltage. Further, the delay deactivation time of Relay E has to be longer than that of Relay C to allow Relay D to initiate its activation when switching to low voltage monitoring, and then to disengage its initial activation connection path to the line wires to avoid damage by high voltage when it is present. In case Relay C, Relay D or Relay E malfunction, as a necessary safety measure, a fuse must be added as shown to protect the low voltage relays and the circuit wiring.

A few parting notes are in order. The constantly energized wires always depend on the existence of line power for voltage detection. It is the easiest approach to providing protection. The un-energized wires or intermittently energized wires require an added power source. The cost of protecting intermittently energized wires rises a little further, as the costs of the voltage detection units are higher. However, overall system cost is still very low.

For soft starters where the contactors output voltage is dependent on the control voltage of its energizing circuit, Relay A (in FIG. 8) as well as the voltage sensors in the voltage detection units must be able to accept variable voltage inputs. These relays are controlled by more expensive electronic circuits, but the subject invention works the same way as previously discussed.

The invention claimed is:

1. A method of protecting against theft of an elongate object formed of electrically conductive material, said method comprising the steps of:
   providing a source of electrical power;
   at a first selected location on said elongate object connecting said elongate object to said source of electrical power to electrically energize said elongate object;
   at a second location on said elongate object spaced from said first location connecting a voltage detection unit including a voltage sensor and a signal transmitter to said elongate object;
   employing said voltage sensor to sense the voltage of said elongate object; and
   activating said signal transmitter to send a signal responsive to said voltage sensor sensing a change in voltage of said elongate object, said elongate object comprising wiring used for distribution of electricity received from said source of electrical power, said voltage detection unit being one of a plurality of voltage detection units, each of said plurality of voltage detection units including a voltage sensor and a signal transmitter, said method including the additional steps of connecting the voltage detection units to said wiring at spaced locations along said wiring whereby segments of said wiring are formed between adjacent voltage detection units and providing a signal receiver and employing the signal transmitters of said voltage detection units to transmit signals to said signal receiver, the signals transmitted to said signal receiver indicating change of voltage of the wiring at each of said voltage detection units and also identifying the voltage detection unit from which each signal is being sent.

2. The method according to claim 1 including the step of employing signals received by said signal receiver from said plurality of voltage detection units to identify a particular segment of said wiring where a cut in the wiring occurs.

3. The method according to claim 2 wherein a cut made in a segment of wiring is operable to cause voltage loss in the voltage detection unit defining the downstream end of the segment where the cut is made.

4. The method according to claim 3 wherein said cut is additionally operable to cause voltage loss in all voltage detection units connected to the wiring downstream of the cut.

5. The method according to claim 2 including the step of converting the signals from said voltage detection units to segment descriptions to facilitate prompt response by personnel when a cut in the wiring occurs.

6. The method according to claim 1 including the step of providing at least one alarm unit along said wiring to provide an auditory, visual or other type of alarm signal responsive to a cut made in said wiring.

7. Apparatus for protecting against theft of an elongate object formed of electrically conductive material and connected to a source of electrical power, said apparatus comprising, in combination:
  a voltage detection unit connected to said elongate object, said voltage detection unit including a voltage sensor and a signal transmitter, said voltage sensor sensing the voltage of said elongate object and said signal transmitter sending a signal responsive to said voltage sensor sensing a change in voltage of said elongate object; and
  a signal receiver for receiving said signal, said elongate object comprising wiring used for distribution of electricity received from said source of electrical power and said voltage detection unit being one of a plurality of voltage detection units, each of said plurality of voltage detection units including a voltage sensor and a signal transmitter, said voltage detection units being connected to said wiring at spaced locations along said wiring whereby segments of said wiring are formed between adjacent voltage detection units, the signal transmitters of all said voltage detection units for transmitting signals to said signal receiver, the signals transmitted to said signal receiver by said signal transmitters indicating a change of voltage of the wiring at each of said voltage detection units and also identifying the voltage detection unit from which each signal is being sent.

8. The apparatus according to claim 7 wherein at least some of the signal transmitters produce signals received by said signal receiver employed to identify a particular segment of said wiring where a cut in the wiring occurs.

9. The apparatus according to claim 8 wherein a cut made in a segment of wiring is operable to cause voltage loss in the voltage detection unit defining the downstream end of the segment where the cut is made.

10. The apparatus according to claim 9 wherein said cut is additionally operable to cause voltage loss in all voltage detection units connected to the wiring downstream of the cut.

11. The apparatus according to claim 7 additionally including at least one alarm unit along said wiring to provide an auditory, visual or other type of alarm signal responsive to a cut made in said wiring.

12. A method of protecting against theft of an elongate object formed of electrically conductive material, said method comprising the steps of:
  providing a source of electrical power;
  at a first selected location on said elongate object connecting said elongate object to said source of electrical power to electrically energize said elongate object;
  at a second location on said elongate object spaced from said first location connecting a voltage detection unit including a voltage sensor and a signal transmitter to said elongate object;
  employing said voltage sensor to sense the voltage of said elongate object; and
  activating said signal transmitter to send a signal responsive to said voltage sensor sensing a change in voltage of said elongate object, said elongate object comprising wiring used for distribution of electricity received from said source of electrical power, said voltage detection unit being one of a plurality of voltage detection units, each of said plurality of voltage detection units including a voltage sensor and a signal transmitter, said method including the additional steps of connecting the voltage detection units to said wiring at spaced locations along said wiring whereby segments of said wiring are formed between adjacent voltage detection units and providing a signal receiver and employing the signal transmitters of said voltage detection units to transmit signals to said signal receiver, said signal receiver being a component of an alarm base unit, said alarm base unit further including a controller and a communicator, said method further including the steps of employing the controller to program and control functioning of the alarm base unit, identifying incoming signals received from said voltage detection units by said signal receiver and employing the communicator to forward the signals to another location.

13. A method of protecting against theft of an elongate object formed of electrically conductive material, said method comprising the steps of:
  providing a source of electrical power;
  at a first selected location on said elongate object connecting said elongate object to said source of electrical power to electrically energize said elongate object;
  at a second location on said elongate object spaced from said first location connecting a voltage detection unit including a voltage sensor and a signal transmitter to said elongate object;
  employing said voltage sensor to sense the voltage of said elongate object; and
  activating said signal transmitter to send a signal responsive to said voltage sensor sensing a change in voltage of said elongate object, said elongate object comprising wiring used for distribution of electricity received from said source of electrical power, and said source of electrical power being a primary source of electrical power and said wiring being intermittently energized to distribute electricity from said primary source of electrical power, the method additionally comprising the steps of providing a secondary source of electrical power and connecting said wiring to said secondary source of electrical power to electrically energize said wiring when said wiring is not receiving electricity from said primary source of electrical power.

14. Apparatus for protecting against theft of an elongate object formed of electrically conductive material and connected to a source of electrical power, said apparatus comprising, in combination:
  a voltage detection unit connected to said elongate object, said voltage detection unit including a voltage sensor and a signal transmitter, said voltage sensor sensing the voltage of said elongate object and said signal transmitter sending a signal responsive to said voltage sensor sensing a change in voltage of said elongate object; and
  a signal receiver for receiving said signal, said elongate object comprising wiring used for distribution of electricity received from said source of electrical power and said voltage detection unit being one of a plurality of voltage detection units, each of said plurality of voltage detection units including a voltage sensor and a signal transmitter, said voltage detection units being connected to said wiring at spaced locations along said wiring whereby segments of said wiring are formed between adjacent voltage detection units, the signal transmitters of all said voltage detection units for transmitting signals to said signal receiver, said signal receiver being a component of an alarm base unit, said alarm base unit further including a controller and a communicator, said controller for performing program and control functions of the alarm base unit and identifying incoming signals received from said voltage detection units by said signal receiver, and said communicator forwarding the signals to another location.

15. Apparatus for protecting against theft of an elongate object formed of electrically conductive material and connected to a source of electrical power, said apparatus comprising, in combination:

a voltage detection unit connected to said elongate object, said voltage detection unit including a voltage sensor and a signal transmitter, said voltage sensor sensing the voltage of said elongate object and said signal transmitter sending a signal responsive to said voltage sensor sensing a change in voltage of said elongate object; and a signal receiver for receiving said signal, said elongate object comprising wiring used for distribution of electricity received from said source of electrical power, said source of electrical power being a primary source of electrical power and said wiring being intermittently energized to distribute electricity from said primary source of electrical power, the apparatus additionally comprising a secondary source of electrical power, said wiring being connected to said secondary source of electrical power to electrically energize said wiring when said wiring is not receiving electricity from said primary source of electrical power.

16. A method of protecting against theft of an elongate object formed of electrically conductive material, said method comprising the steps of:

providing a source of electrical power;

at a first selected location on said elongate object connecting said elongate object to said source of electrical power to electrically energize said elongate object;

at a second location on said elongate object spaced from said first location connecting a voltage detection unit including a voltage sensor and a signal transmitter to said elongate object;

employing said voltage sensor to sense the voltage of said elongate object; and activating said signal transmitter to send a signal responsive to said voltage sensor sensing a change in voltage of said elongate object, said elongate object comprising wiring used for distribution of electricity received from said source of electrical power, the line voltage of said wiring alternatively changing between a high voltage condition and a low voltage condition, the method including the step of detecting when a change between high voltage and low voltage conditions occurs, and responsive to detection of such change in line voltage, switching the connection between said wiring and said voltage detection unit to allow operation of said voltage detection unit under the detected line voltage condition.

17. Apparatus for protecting against theft of an elongate object formed of electrically conductive material and connected to a source of electrical power, said apparatus comprising, in combination:

a voltage detection unit connected to said elongate object, said voltage detection unit including a voltage sensor and a signal transmitter, said voltage sensor sensing the voltage of said elongate object and said signal transmitter sending a signal responsive to said voltage sensor sensing a change in voltage of said elongate object; and a signal receiver for receiving said signal, said elongate object comprising wiring used for distribution of electricity received from said source of electrical power, the line voltage of said wiring alternatively changing between a high voltage condition and a low voltage condition, the apparatus additionally including detection structure for detecting when a change between high voltage and low voltage conditions occurs, and switch structure responsive to detection of such change in line voltage switching the connection between said wiring and said voltage detection unit to allow operation of said voltage detection unit under the detected line voltage condition.

18. The method according to claim 12 including the step of installing the alarm base unit on said wiring substantially midway along the length of said wiring.

19. The method according to claim 12 wherein said wiring includes a plurality of wiring branches, the method including the step of connecting at least one voltage detection unit to at least one of said wiring branches and directing signals from each of said voltage detection units to the alarm base unit.

20. The method according to claim wherein lights are connected to the wiring of each of said branches.

21. The method according to claim 13 wherein the voltage of the electricity provided by said secondary source of electrical power is lower than the voltage of the electricity provided by said primary source of electrical power.

22. The method according to claim 13 wherein the contacts of a contactor are used to establish connection between said wiring and said primary source of electrical power or alternatively break said connection, said method additionally including the step of providing a connection between said secondary source of electrical power and said wiring responsive to breaking of the connection between the primary source of electrical power and said wiring, and terminating the connection between said secondary source of electrical power and said wiring when the contacts of the contactor reestablish connection between said wiring and said primary source of electrical power.

23. The method according to claim 22 including the step of delaying the step of providing a connection between said secondary source of electrical power and said wiring responsive to the breaking of the connection between the primary source of electrical power and wiring to allow for the dissipation of high electrical charges built up by the connection to the primary source of electrical power.

24. The apparatus according to claim 14 wherein the alarm base unit is on said wiring substantially midway along the length of said wiring.

25. The apparatus according to claim 14 wherein said wiring includes a plurality of wiring branches, at least one voltage detection unit connected to at least one of said wiring branches and directing signals from each of said voltage detection units to the alarm base unit.

26. The apparatus according to claim 25 wherein lights are connected to the wiring of each of the branches.

27. The apparatus according to claim 15 wherein the voltage of the electricity provided by said secondary source of electrical power is lower than the voltage of the electricity provided by said primary source of electrical power.

28. The apparatus according to claim 15 additionally comprising control structure for establishing a connection between said secondary source of electrical power and said wiring responsive to breaking of a connection between the primary source of electrical power and said wiring, and for terminating the connection between said secondary source of electrical power and said wiring when a connection is reestablished between said wiring and said primary source of electrical power.

29. The apparatus according to claim 28 including delaying means for delaying providing a connection between said secondary source of electrical power and said wiring responsive to the breaking of the connection between the primary source of electrical power and wiring to allow for the dissipation of high electrical charges built up during the connection between the wiring and the primary source of electrical power.

30. The apparatus according to claim 28 wherein said control structure includes a contactor having contacts controlled by an activator in the form of either an electromagnetic coil or a solid-state circuit and a switching relay in parallel with the activator.

31. The method according to claim 16 wherein a plurality of relays selectively energized by wiring line voltage are employed to perform the detection and switching steps.

32. The method according to claim 31 wherein said relays are operable to effect a delay when switching to low voltage operation from high voltage operation to allow for the dissipation of high electrical charges built up by the high voltage connection.

33. The method according to claim 31 wherein at least one of said relays is operable to control sending of alarm signals.

34. The apparatus according to claim 17 wherein a plurality of relays are incorporated in said detection structure and said switch structure, said relays selectively energized by wiring line voltage to perform the detection and switching.

35. The apparatus according to claim 34 wherein said relays are operable to effect a delay when switching to low voltage operation from high voltage operation to allow for the dissipation of high electrical charges built up by the high voltage connection.

36. The apparatus according to claim 34 wherein at least one of said relays is operable to control sending of alarm signals.

* * * * *